US006260990B1

(12) United States Patent
Saunders

(10) Patent No.: US 6,260,990 B1
(45) Date of Patent: Jul. 17, 2001

(54) TRUCK LIGHTS

(76) Inventor: Gerald N. Saunders, 59 S. Wycliff Dr., Durham, NC (US) 27709

( * ) Notice: Subject to any disclaimer, the term of this patent is extended or adjusted under 35 U.S.C. 154(b) by 0 days.

(21) Appl. No.: 09/436,383

(22) Filed: Nov. 9, 1999

(51) Int. Cl.[7] .................................................. B60Q 1/00
(52) U.S. Cl. ........................ 362/485; 362/459; 362/487; 362/496
(58) Field of Search ................ 362/80, 82, 479, 362/529, 530, 531, 532, 493, 459, 485, 490, 487, 512; 410/106

(56) References Cited

U.S. PATENT DOCUMENTS

| | | | |
|---|---|---|---|
| 4,692,845 | * 9/1987 | Widhalm et al. | 362/80 |
| 4,791,535 | * 12/1988 | Sclafani et al. | 362/82 |
| 4,818,006 | 4/1989 | Arndt | 296/32 |
| 5,023,760 | 6/1991 | Izuno | 362/66 |
| 5,171,083 | 12/1992 | Rich | 362/73 |
| 5,255,164 | 10/1993 | Eidelman | 362/61 |
| 5,495,400 | 2/1996 | Currie | 362/32 |
| 5,584,521 | 12/1996 | Hathaway et al. | 296/36 |
| 5,795,051 | * 8/1998 | Galanski | 362/80 |
| 5,871,270 | 2/1999 | Ricker et al. | 362/80 |
| 5,904,458 | * 5/1999 | Bundy | 410/106 |

* cited by examiner

Primary Examiner—Sandra O'Shea
Assistant Examiner—Bao Truong
(74) Attorney, Agent, or Firm—Mills Law Firm PLLC

(57) ABSTRACT

A retractable truck light assembly for trucks that provides increased lighting and visibility when a truck is towing a trailer. The truck light assembly includes a retractable light housing that is affixed to the truck bed side wall. The housing further includes a pivotal mount whereby the truck light housing swivels outward from the truck body to an extended position and swivels inward to the truck body to a retracted position. The truck light assembly also includes an adjustable rod attachable to the truck bed side wall. The adjustable rod includes a concave receptor shaped and positioned to receive the truck light housing in its retracted position such that the truck light housing does not substantially protrude beyond the aerodynamic plane of the truck bed side wall. In the preferred embodiment, the truck light system includes a pair of truck light assemblies for positioning on the driver and passenger sides of the truck, respectively.

9 Claims, 2 Drawing Sheets

TRUCK LIGHTS

BACKGROUND OF THE INVENTION

1. Field of the Invention The present invention relates generally to exterior lights for vehicles, more particularly, to a retractable light assembly for trucks.

2. Description of Prior Art

Typically, trucks employ additional rearward lighting for increased motor vehicle safety and visibility when towing trailers for carrying additional cargo, boats, recreational vehicles, and the like. Historically, additional rearward lighting for trucks has been achieved by electrically connecting trailer lights to the truck's existing built-in lighting system. This solution has been problematic because of the additional time required for connecting and disconnecting trailer lights. Furthermore, the risk of misconnection and/or malfunction of the trailer lights is not readily observable by the operator of the vehicle. Thus, trailer lighting, being both time consuming and introducing possibility of error, inadequately addresses the problem of providing convenient and reliable additional rearward lighting for trucks towing trailers. Therefore, there remains a need for effective and efficient additional rearward lighting for trucks.

Additionally, prior art lighting for use on vehicles have attempted to provide additional lighting for cars and trucks whereby additional lights are incorporated in luggage rack bars and light bars extending the length and/or width of the vehicle. These prior art solutions introduce the use of a fixed light bar mounted onto the roof or rear end of the vehicle. Because these light bars extend substantially either the length or width of the vehicle, they must be permanently attached to the vehicle, or require significant time to attach and detach. Furthermore, the size, shape, and position of these prior art light bars substantially alter and diminish the aerodynamics of the vehicle, with or without trailer in tow. Also, the prior art light bars do not extend far enough away from the body of the vehicle to ensure increased visibility, and therefore safety. Thus, there remains a need for effective and efficient additional rearward lighting for trucks.

CONCISE EXPLANATION OF PRIOR ART

U.S. Pat. No. 4,818,006 to Gustav E. Arndt discloses a pickup bed protector with a red taillight lens and a yellow side light lens with strap tie down means.

U.S. Pat. No. 5,023,760 to Herb Izuno, Assignee Paccar, Inc. of Bellevue, Wash. discloses a turn signal assembly that is built into the body of the truck.

U.S. Pat. No. 5,495,400 to Joseph E. Currie discloses an optical fiber illuminating device that can be mounted on the bed of a pickup truck and includes brake lights, parking lights and turn signals.

U.S. Pat. No. 5,584,521 to Richard C. Hathaway, Merl K. Bridges and Donald R. Klein, Assignee CR&I, Inc. of Greenville, Ohio is a vehicle modular rail system that supports accessories on a pickup truck bed.

U.S. Pat. No. 5,171,083 to Lawrence D. Rich, Assignee LTC Roll & Engineering Co., of Mt. Clemens, Mich. is a combination luggage rack and concealed lights for vehicle roof which pivots outwardly when the lights are turned on.

U.S. Pat. No. 5,871,270 to John David Ricker and Kim S. Ricker is a quick connect and disconnect light bar for container trucks.

Finally, U.S. Pat. No. 5,255,164 to Gabriel Eidelman, Assignee Gabriel Eidelman of Rockville, Md. is a safety light marker system for motor vehicles that are mounted on the sides and the roof of such vehicle.

SUMMARY OF THE INVENTION

The present invention is directed to a truck light assembly, more particularly, for a retractable light assembly for trucks that provides increased rearward lighting and visibility when a truck is towing a trailer. The truck light assembly includes a retractable light housing that is affixed to the truck bed side wall. The housing further includes a pivotal mount whereby the truck light housing swivels outward from the truck body to an extended position and swivels inward to the truck body to a retracted position. The truck light assembly further includes an adjustable rod attachable to the truck bed side wall. The adjustable rod includes a concave receptor shaped and positioned to receive the truck light housing in its retracted position such that the truck light housing does not substantially protrude beyond the aerodynamic plane of the truck bed side wall. In the preferred embodiment, the truck light system includes a pair of truck light assemblies for positioning on the driver and passenger sides of the truck, respectively.

Thus, the present invention provides a retractable light assembly for trucks having increased safety via increased rearward lighting and visibility when a truck is towing a trailer.

Accordingly, it is an object of the present invention is to provide a retractable light assembly for trucks that increases rearward lighting and visibility when a truck is towing a trailer.

Another object of the present invention to provide a retractable light assembly for trucks that does not substantially diminish the aerodynamics of the truck body, with or without the trailer in tow.

Another object of the present invention is to provide an adjustable light assembly that easily and quickly retracts and extends via pivotal connection with the truck bed wall.

Another object of the present invention to provide a detachable light assembly for mounting onto and into a removable and adjustable truck light rod that is removably attached to the truck bed wall and/or body.

Other objects and advantages of the present invention will become apparent and obvious from a study of the following description and the accompanying drawings which are merely illustrative of such invention.

DETAILED DESCRIPTION OF PREFERRED EMBODIMENT

Figure 1:
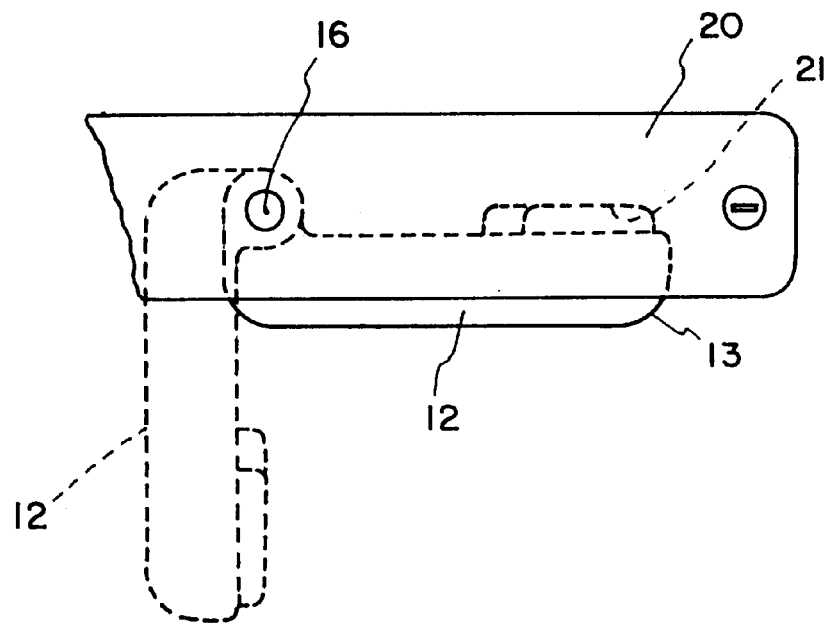
FIG. 1 is a top view of a truck light assembly constructed according to the present invention.

As best seen in FIG. 1, a truck light assembly 10 includes a light housing 12 for protectively enclosing a light 14 electrically connected to function simultaneously with the truck's existing rearward lights (not shown). The truck light assembly indicated generally at 10, is removably attached to the truck body 18 at a top horizontal plane of the truck bed side wall 22. Additionally, in a preferred embodiment, the truck light assembly 10 includes an adjustable connector rod 20 that is directly attached to the truck body. The connector rod has a forward end 44 and a rearward end 46 that are removably attached to the truck body via connectors 30A, 30B, respectively. The additional truck lights 14 are electrically connected to the truck light wiring via electrical wiring 32.

Figure 2:
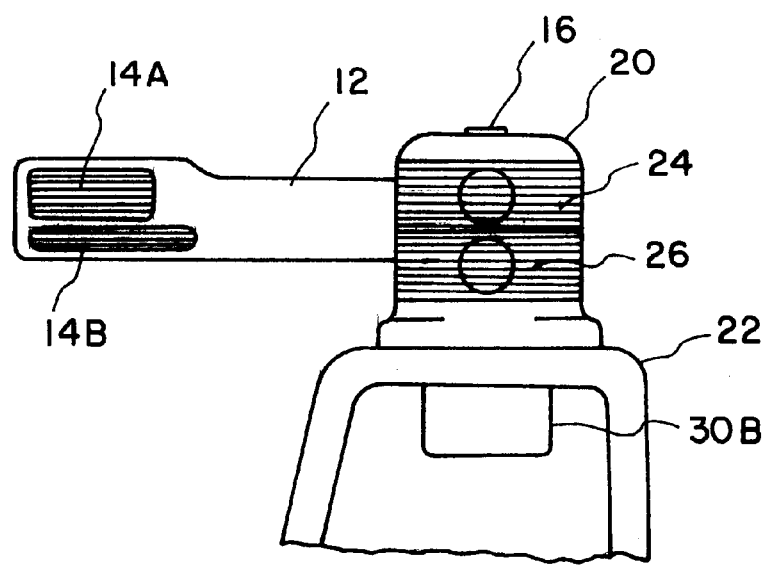
FIG. 2 is a left rear view of the truck light assembly shown in FIG. 1.

In a preferred embodiment, the truck light housing 12 is pivotally connected with the connector rod 20 so that the housing 12 swivels between a retracted position, as shown in FIG. 1, and an extended position, as shown in FIG. 2. The connector rod 20 further includes a concave receptor 21 shaped and positioned for receiving the housing 12 in its retracted position such that the forward side 13 of the housing is substantially parallel with the longitudinal axis of the connector rod 20 and the truck side wall 18, so as to have minimal impact on the aerodynamics of the truck.

In a preferred embodiment, the connector rod is substantially cylindrical. Alternatively, the connector rod may have a rectangular, triangular, or multi-faced cross-section to provide lightweight strength and stability.

Referring now to FIG. 2, in a preferred embodiment, the truck light assembly 10 is pivotally extended away from the retracted position in the concave receptor 21 so that the light housing 12 is substantially perpendicular to the truck side wall 22 with the forward housing surface 13 facing the front of the vehicle and the light 14 facing rearward so as to be visible from a following vehicle behind the truck.

Also in a preferred embodiment, the light housing 12 further includes a top light 14A and a bottom light 14B. Preferably, top light 14A and bottom light 14B are different colors and function independently of each other. Also, preferably, top light 14A corresponds to and simultaneously functions with a brake light and turn signal of the truck (not shown) and bottom light 14B corresponds to and simultaneously functions with a back-up or reverse light of the truck (not shown). Preferably, the top light 14A is red; the bottom light 14B is white. Additionally, in a preferred embodiment, the connector rod 20 includes a brake light 24 and a back-up light 26 that correspond to, are colored like, and function simultaneously with lights 14A and 14B, respectively.

Figure 3:
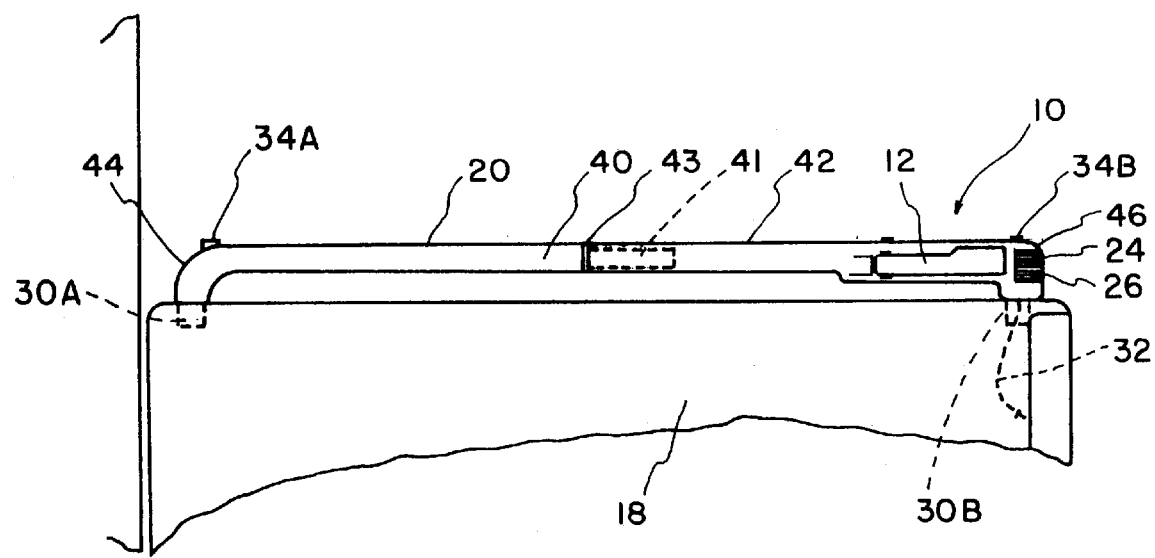
FIG. 3 is a side view of the truck light assembly shown in FIG. 1.

Referring now to FIG. 3, in a preferred embodiment, the connector rod 20 includes two concentric sections 40, 42 wherein a first section 40 has a female end 41 having an inner diameter greater than the outer diameter of the male end 43 of the second section 42 of the connector rod, for securedly and adjustably receiving the second section 42 of the connector rod 20. Once the first and second sections 40, 42 respectively, have been positioned at a predetermined setting to fit the truck bed side wall 18, the sections are secured with a locking device 34A, 34B respectively, for securing the connector rod 20 to the truck. In a preferred embodiment, the locking device is a key lock that provides security against theft.

The foregoing preferred embodiments describe and illustrate a driver side truck light assembly. The present invention is directed toward a symmetrical light system wherein a similar passenger side truck light assembly, in mirror image to the driver side truck light assembly, is constructed and positioned to function equivalently from the opposite side of the truck body.

The terms "forward", "rearward", "left", "right" "upwardly", "downwardly" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A truck light assembly for a pick-up truck body, the truck light assembly comprising:

a connector rod directly and removably connected with the truck body at a top horizontal surface of the truck body;

a light housing pivotally connected to said connector rod, said connector rod having a concave receptor shaped and positioned to receive said light housing; and a light positioned in the housing to provide additional rearward lighting for the truck, the light electrically connected to an electric light system of the truck, thereby providing additional rearward lighting.

2. The truck light assembly according to claim 1, wherein the light is a halogen light.

3. The truck light assembly according to claim 1, wherein the connector rod further includes concentric inner and outer rods having male and female ends, respectively for providing secure adjustment between the first and second positions.

4. The truck light assembly according to claim 1, wherein the connector rod is affixed to the truck body via a lock device.

5. The truck light assembly according to claim 4, wherein the lock device is a key lock.

6. The truck light assembly according to claim 1, wherein the light housing is pivotally connected to the connector rod for providing swivel movement between a retracted position and an extended position.

7. The truck light assembly according to claim 1, wherein the connector rod is substantially cylindrical.

8. The truck light assembly according to claim 1, wherein the connector rod has a rectangular cross-section.

9. A truck light assembly for a pick-up truck body, the truck light assembly comprising:

a connector rod connected with the truck body on the driver side and passenger side at a top horizontal surface of the truck body;

a pair of light housing pivotally connected with the truck body at a driver side and a passenger side top horizontal surface of the truck body, respectively; said connector rods having concave receptors shaped and positioned to receive the light housings in retracted positions and a pair of light positioned in the housings, respectively, to provide additional rearward lighting for the truck, thereby providing additional rearward lighting.

* * * * *